(12) United States Patent
Yanai (10) Patent No.: US 7,245,657 B2
(45) Date of Patent: Jul. 17, 2007

(54) JITTER RESISTANCE MEASURING INSTRUMENT AND METHOD FOR ENABLING EFFICIENT MEASUREMENT OF JITTER RESISTANCE CHARACTERISTIC AND ADEQUATE EVALUATION

(75) Inventor: Takashi Yanai, Ayase (JP)

(73) Assignee: Anritsu Coporation, Tokyo (JP)

( * ) Notice: Subject to any disclaimer, the term of this patent is extended or adjusted under 35 U.S.C. 154(b) by 974 days.

(21) Appl. No.: 10/362,352

(22) PCT Filed: Jul. 11, 2002

(86) PCT No.: PCT/JP02/07055

§ 371 (c)(1),
(2), (4) Date: Feb. 21, 2003

(87) PCT Pub. No.: WO03/007578

PCT Pub. Date: Jan. 23, 2003

(65) Prior Publication Data

US 2003/0156673 A1    Aug. 21, 2003

(51) Int. Cl.
*H04B 17/00*   (2006.01)

(52) U.S. Cl. .................. 375/226; 375/224; 375/371

(58) Field of Classification Search ............... 375/371, 375/224, 226
See application file for complete search history.

(56) References Cited

U.S. PATENT DOCUMENTS

| | | | |
|---|---|---|---|
| 5,793,822 A | 8/1998 | Anderson et al. | |
| 5,835,501 A | 11/1998 | Dalmia et al. | |
| 6,661,836 B1 * | 12/2003 | Dalal et al. | ............... 375/226 |
| 7,142,623 B2 * | 11/2006 | Sorna | ..................... 375/376 |

FOREIGN PATENT DOCUMENTS

| | | |
|---|---|---|
| JP | 61-182348 A | 8/1986 |
| JP | 62-104342 A | 5/1987 |
| JP | 03-091340 | 4/1991 |
| JP | 4-096533 A | 3/1992 |
| JP | 2001-213723 | * 7/2001 |

OTHER PUBLICATIONS

Christensen, "A comparison of ITU-T and FC/GE jitter methodology applied to jitter tolerance and eye opening measurements on high-speed CDRs" IEEE P802.3ae 10Gb/s Ethernet Task Force Jitter Documents Feb. 22, 2001.*

(Continued)

*Primary Examiner*—Temesghen Ghebretinsae
*Assistant Examiner*—Juan Alberto Torres
(74) *Attorney, Agent, or Firm*—Frishauf, Holtz, Goodman & Chick, P.C.

(57) ABSTRACT

A control section varies an amplitude of a modulation signal every time the control section conducts control to vary a combination of the frequency of a clock signal and the frequency of the modulation signal by controlling a clock signal generator and a modulation signal generator, and derives a value indicating jitter tolerance of a measurement subject based on a decision result on an error of a data signal having a predetermined pattern output from the measurement subject and information of the amplitude of the modulation signal. A display section receives information concerning the frequency of the clock signal, the frequency of the modulation signal, and the amplitude of the modulation signal, and the value indicating jitter tolerance, and displays jitter tolerance characteristics of the measurement subject simultaneously on a screen by using the frequency of the clock signal and the frequency of the modulation signal as two parameters.

20 Claims, 6 Drawing Sheets

OTHER PUBLICATIONS

ITU-T Telecommunication Standarization Sector of ITU; 0.171; Series O: Specifications of Measuring Equipment; Apr. 1997; pp. 1-28.

Hewlett-Packard Application Note 1267: "Frequency agile jitter measurement system," Hewlett-Packard, Internet Citation, Apr. 1995, Retrieved from the Internet: URL/http://www.tm.agilent.com/classes/MasterServlet?view=applicationnote&apn-ItemID-1000000272&1language=eng&locale=US>, XP-002186891, H04I1/20g, pp. 1-25.

Miller, C.T., et al: "Jitter Analysis of High-Speed Digital Systems", Hewlett-Packard Journal, Hewlett-Packard Co. Palo Alto, US, vol. 46, No. 1, Feb. 1, 1995, pp. 49-56, XP000502761.

* cited by examiner

Ordinate : Amplitude
Abscissa : Modulation frequency

Ordinate : Amplitude
Abscissa : Principal signal frequency    (offset)

JITTER RESISTANCE MEASURING INSTRUMENT AND METHOD FOR ENABLING EFFICIENT MEASUREMENT OF JITTER RESISTANCE CHARACTERISTIC AND ADEQUATE EVALUATION

This application is a U.S. National Phase Application under 35 USC 371 of International Application PCT/JP02/07055 filed Jul. 11, 2002.

TECHNICAL FIELD

The present invention relates to a jitter tolerance measurement apparatus and method, and more particular, to a jitter tolerance measurement apparatus, and method adopting such a technique as to make efficient jitter tolerance measurement for measuring how a measurement subject such as a data transmission device can tolerate a phase fluctuation (jitter) of a data signal or the like and accurately evaluate jitter tolerance characteristics of the measurement subject.

BACKGROUND ART

For example, in a data relay apparatus among devices handling data signals, a data signal is reproduced and output based on a clock signal reproduced from an input data signal.

If in this case there is a phase fluctuation (jitter) in the data signal input, then reproduction of the data signal cannot be conducted correctly and a false data signal is output.

In the case where such a device is used in a data transmission system, therefore, it is necessary to previously ascertain the jitter quantity the device can tolerate.

The measurement of the jitter tolerance is conducted by applying phase modulation to a clock signal, which forms a basis of a data signal handled by a measurement subject, with a modulating signal of a sine wave, gradually increasing the amplitude of the modulation signal, and measuring an amplitude of the modulation signal at which it becomes impossible for the measurement subject to handle the data signal accurately. This measurement can be conducted by using, for example, a known pulse pattern generator and a known error measurement device as disclosed in Japanese Patent Application KOKAI Publication No. 4-96533.

In other words, based on the clock signal that is phase-modulated by the modulation signal of the sine wave and consequently that involves jitter depending upon the phase modulation quantity, a data signal having a predetermined pattern is generated based on the clock signal having the jitter by the pulse pattern generator and supplied to the measurement subject.

A data signal output from the measurement subject is compared bit by bit with a data sequence of a predetermined pattern in the error measurement device that is set so as to become the same as the data signal of the predetermined pattern generated by the pulse pattern generator. It is thus determined whether or not an error has occurred.

A limit value of jitter quantity below which an error does not occur is called the jitter tolerance of the measurement subject.

Here, jitter tolerance of the measurement subject is expected to depend on the deviation of the frequency of the clock signal from the frequency of the data signal originally to be handled by the measurement subject and jitter frequency (frequency of the modulation signal).

Therefore, the conventional jitter tolerance measurement apparatus has such a configuration that jitter tolerance measurement can be conducted in two measurement modes.

In a first measurement mode, jitter tolerance is measured while fixing the modulation signal at a standard frequency and varying the frequency of the clock signal, and thereby characteristics of the clock signal frequency versus jitter tolerance are displayed on a display device in a two-dimensional manner.

In a second measurement mode, jitter tolerance is measured while fixing the clock signal at a frequency having no deviation and varying the frequency of the modulation signal, and thereby characteristics of the modulation signal frequency versus jitter tolerance are displayed on the display device in a two-dimensional manner.

However, the above described conventional jitter tolerance measurement apparatus has only the function of independently conducting measurement of jitter tolerance of the measurement subject with respect to the frequency of the clock signal in the first measurement mode and measurement of jitter tolerance of the measurement subject with respect to the frequency of the modulation signal in the second measurement mode and displaying those measurement results individually.

In the conventional jitter tolerance measurement apparatus, therefore, jitter tolerance measurement of the measurement subject must rely on so-called spot measurement in which trial and error of measurement are repeated. This results in a problem that the measurement is extremely inefficient.

Furthermore, even if the measurement of the modulation signal versus jitter tolerance is conducted every clock signal frequency, the conventional jitter tolerance measurement has only the function of displaying the jitter characteristics in a two-dimensional manner. Therefore, jitter characteristics must be displayed individually every clock frequency. This results in a problem that it is impossible to easily ascertain jitter tolerance characteristics and effect an evaluation accurately.

In "1. 2 Test environment", ITU-T Recommendation 0.171 (04/97), page 13, which is international measurement standards of this kind, there is a stipulation to the effect that "In order to verify the worst-case equipment performance, it may be necessary to stress the equipment under test with multiple change in the test environment."

In other words, according to the definition in the standard, it is necessary in jitter tolerance measurement to confirm jitter tolerance of the equipment under the severest conditions.

In the conventional jitter tolerance measurement apparatus, however, jitter tolerance measurement is generally conducted in such a state that an offset is not applied to a principal signal, i.e., in a state that is not under the severest condition as defined in the above described standard, for the reason that it takes time or for other reason.

DISCLOSURE OF INVENTION

An object of the present invention is to provide a jitter tolerance measurement apparatus that is capable of solving the above described problems, evaluating jitter tolerance characteristics of a measurement subject simultaneously by using the clock signal frequency and the modulation signal frequency as two parameters and measuring the jitter tolerance characteristics efficiently.

Another object of the present invention is to provide a jitter tolerance measurement method that is capable of solving the above described problems, evaluating jitter tolerance characteristics of a measurement subject simultaneously by using the clock signal frequency and the modulation signal frequency as two parameters and measuring the jitter tolerance characteristics efficiently.

In order to achieve the above object, according to a first aspect of the present invention, there is provided a jitter tolerance measurement apparatus comprising:

a modulation signal generator (22) which outputs a modulation signal having a variable frequency and a variable amplitude;

a clock signal generator (21) which generates a clock signal having a variable frequency, receives the modulation signal output from the modulation signal generator, generates jitter based on the modulation signal on the clock signal, and outputs the clock signal provided with the jitter;

a pulse pattern generator (30) which receives the clock signal provided with the jitter, output from the clock signal generator, generates a data signal having a predetermined pattern, and supplies the data signal to a measurement subject (1);

an error detector (23) which receives a data signal having the predetermined pattern output from the measurement subject that operates based on the data signal having the predetermined pattern outputted from the pulse pattern generator, compares the data signal with a preset data sequence having a predetermined pattern, and thereby measures errors in the data signal having the predetermined pattern output from the measurement subject;

a decision section (24a) which decides whether or not errors output from the error detector are in a preset reference range, and outputs a decision result;

a control section (24b to 24e) which conducts control to vary the amplitude of the modulation signal every time conducting control to vary a combination of a frequency of the clock signal and a frequency of the modulation signal by controlling the clock signal generator and the modulation signal generator, and derives a value indicating jitter tolerance of the measurement subject based on the decision result and information of the amplitude of the modulation signal; and a display section (25, 26) which receives information concerning the frequency of the clock signal, the frequency of the modulation signal, and the amplitude of the modulation signal that are controlled by the control section, and the value indicating jitter tolerance, and displays jitter tolerance characteristics of the measurement subject simultaneously on a screen by using the frequency of the clock signal and the frequency of the modulation signal as two parameters.

In order to achieve the above object, according to a second aspect of the present invention, there is provided a jitter tolerance measurement apparatus according to the first aspect, wherein, the control section derives an immediately preceding amplitude value of the modulation signal as the value indicating jitter tolerance, when the amplitude of the modulation signal is varied and the decision section has determined the reference range to be exceeded.

In order to achieve the above object, according to a third aspect of the present invention, there is provided a jitter tolerance measurement apparatus according to the first aspect, wherein, when the amplitude of the modulation signal is set to a specific value, the control section represents the decision result that whether or not the preset reference range is exceeded by the decision section and a specific value of the amplitude of the modulation signal as the value indicating jitter tolerance.

In order to achieve the above object, according to a fourth aspect of the present invention, there is provided a jitter tolerance measurement apparatus according to the first aspect, wherein a unit substantially included in the measurement subject is used as the pulse pattern generator.

In order to achieve the above object, according to a fifth aspect of the present invention, there is provided a jitter tolerance measurement apparatus according to the first aspect, wherein the modulation signal generator outputs a modulation signal (M) having a variable frequency and a variable amplitude to the clock signal generator, and comprises a sine wave generator (22a) which generates a sine wave signal having a frequency set by the control section and a fixed amplitude, and a level varying unit (22b) which varies an amplitude of a sine wave output from the sine wave generator, and an output of the level varying unit is output to the clock signal generator as the modulation signal.

In order to achieve the above object, according to a sixth aspect of the present invention, there is provided a jitter tolerance measurement apparatus according to the first aspect, wherein the clock signal generator generates a clock signal having a frequency set by the control section, receives a modulation signal output from the modulation signal generator, generates jitter based on the modulation signal on the clock signal, and outputs the clock signal provided with the jitter, the clock signal generator having a phase locked loop (PLL) configuration formed of a voltage-controlled oscillator (VCO) (21a), a frequency divider (21b), a reference signal generator (21c), a phase comparator (21d), a low-pass filter (LPF) (21e), and an adder (21f), the VCO outputs the clock signal (C) having a frequency (fc) corresponding to a voltage of an output signal from the adder, to the frequency divider and an output terminal of the VCO, the frequency divider conducts frequency division on the clock signal with a predetermined frequency division ratio, the reference signal generator outputs a reference signal (R) having a frequency (fr) set by the control section, the phase comparator compares an output signal from the frequency divider with the reference signal output from the reference signal generator to obtain a phase difference, and outputs a pulse signal having a pulse width corresponding to the phase difference, the LPF removes a signal component higher than a frequency of the reference signal from the pulse signal output from the phase comparator, and outputs a DC signal having an amplitude corresponding to the phase difference between the output signal of the frequency divider and the reference signal, and the adder adds an output signal from the LPF and the modulation signal output from the modulation signal generator, and outputs an addition result to the VCO.

In order to achieve the above object, according to a seventh aspect of the present invention, there is provided a jitter tolerance measurement apparatus according to the first aspect, wherein the error detector compares a data signal sequence input thereto from the measurement subject with a reference signal sequence having the predetermined pattern to measure an error rate (E), and outputs the error rate.

In order to achieve the above object, according to an eighth aspect of the present invention, there is provided a jitter tolerance measurement apparatus according to the seventh aspect, wherein the decision section compares the error rate output from the error detector with a preset reference value, decides whether or not the error rate is in a reference range of the reference value or less, and outputs a decision result.

In order to achieve the above object, according to a ninth aspect of the present invention, there is provided a jitter tolerance measurement apparatus according to the eighth aspect, wherein the control section has a reference frequency varying section (24b), a modulation frequency varying section (24c), an amplitude varying section (24d) and a storage section (24e), the reference frequency varying section conducts control to vary a frequency of a reference signal output by a reference signal generator in the clock signal generator, the modulation frequency varying section conducts control to vary a frequency of the modulation signal output by the modulation signal generator, the amplitude varying section conducts control to vary an amplitude of the modulation signal output by the modulation signal generator, the storage section stores the amplitude value of the immediately preceding modulation signal (M) as a jitter tolerance value (J) so as to be associated with the combination of the frequencies (fc, fm), when the reference frequency varying section and the modulation frequency varying section respectively vary the frequency (fc) of the clock signal (C) and the frequency (fm) of the modulation signal (M) so as to form a different combination of the frequency (fc) of the clock signal and the frequency (fm) of the modulation signal, the amplitude varying section varies the amplitude of the modulation signal (M) every combination of the frequencies, and an error rate (E) measured by the error detector is determined by the decision section to have exceeded the reference value (Er).

In order to achieve the above object, according to a tenth aspect of the present invention, there is provided a jitter tolerance measurement apparatus according to the ninth aspect, wherein the storage section stores the decision result of the decision section on an error rate (E) measured by the error detector and a specific value of the amplitude as a jitter sweep value (Js) so as to be associated with the combination of the frequencies (fc, fm), at a certain specific value of the amplitude of the modulation signal (M) determined by the amplitude varying section every combination of the frequencies (fc, fm), and instead of storing the jitter tolerance value itself as the value indicating jitter tolerance.

In order to achieve the above object, according to an eleventh aspect of the present invention, there is provided a jitter tolerance measurement apparatus according to the tenth aspect, wherein the display section has a display control section 25 and a display unit 26, the display control section displays the jitter tolerance value J by taking the frequency of the clock signal (C) as a first parameter and the jitter, tolerance value J by taking the frequency of the modulation signal (M) as a second parameter on a screen of the display unit simultaneously so as to be capable of evaluating by a user, based on the frequencies (fc, fm) and the jitter tolerance value (J) stored in the storage section in the control section.

In order to achieve the above object, according to a twelfth aspect of the present invention, there is provided a jitter tolerance measurement apparatus according to the eleventh aspect, wherein the display control section displays a first graph obtained by plotting and displaying the jitter tolerance value (J) on first two-dimensional orthogonal coordinates displaying the amplitude of the modulation signal at an ordinate thereof and the frequency of the modulation signal (M) at the abscissa thereof and a second graph obtained by plotting and displaying the jitter tolerance value (J) on second two-dimensional orthogonal coordinates displaying the amplitude of the modulation signal at the ordinate thereof and an offset frequency of the clock signal (C) as the abscissa thereof simultaneously on the screen of the display unit.

In order to achieve the above object, according to a thirteenth aspect of the present invention, there is provided a jitter tolerance measurement apparatus according to the eleventh aspect, wherein the display control section displays three-dimensional orthogonal coordinates displaying the frequency of the clock signal (C) at a first coordinate axis, the frequency of the modulation signal (M) at a second coordinate axis and the jitter tolerance value (J) at a third coordinate axis on the screen of the display unit, and plots and displays the frequencies (fc, fm) and the jitter tolerance value (J) stored in the storage section in the control section on the three-dimensional orthogonal coordinates.

In order to achieve the above object, according to a fourteenth aspect of the present invention, there is provided a jitter tolerance measurement apparatus according to the eleventh aspect, wherein the jitter tolerance is displayed so that whether the jitter tolerance is good or bad or a margin from the reference value may be discriminated every measurement point.

In order to achieve the above object, according to a fifteenth aspect of the present invention, there is provided a jitter tolerance measurement method comprising:

outputting a modulation signal having a variable frequency and a variable amplitude;

generating a clock signal having a variable frequency, receiving the modulation signal, generating jitter based on the modulation signal on the clock signal, and outputting the clock signal provided with the jitter;

receiving the clock signal provided with the jitter and output, and generating a data signal having a predetermined pattern;

receiving a data signal having the predetermined pattern output from a measurement subject that operates based on the data signal having the predetermined pattern, comparing the data signal with a preset data sequence having a predetermined pattern, and measuring errors in the data signal having the predetermined pattern output from the measurement subject;

deciding whether or not the measured errors are in a preset reference range, and outputting a decision result;

conducting control to vary the amplitude of the modulation signal when conducting control to vary a combination of a frequency of the clock signal and a frequency of the modulation signal, and deriving a value indicating jitter tolerance of the measurement subject based on the decision result and information of the amplitude of the modulation signal; and receiving information concerning the frequency of the clock signal, the frequency of the modulation signal, and the amplitude of the modulation signal, and the value indicating jitter tolerance, and displaying jitter tolerance characteristics of the measurement subject simultaneously on a screen by using the frequency of the clock signal and the frequency of the modulation signal as two parameters.

In order to achieve the above object, according to a sixteenth aspect of the present invention, there is provided a jitter tolerance measurement method according to the fifteenth aspect, wherein, the controlling derives, an immediately preceding amplitude value of the modulation signal, as the value indicating jitter tolerance when the amplitude of the modulation signal is varied and the decision section has determined the reference range is exceeded.

In order to achieve the above object, according to a seventeenth aspect of the present invention, there is provided a jitter tolerance measurement method according to the fifteenth aspect, wherein when the amplitude of the modulation signal is set to a specific value, the controlling represents the decision result that whether or not the preset reference range is exceeded and a specific value of the amplitude of the modulation signal as the value indicating jitter tolerance.

In order to achieve the above object, according to an eighteenth aspect of the present invention, there is provided a jitter tolerance measurement method according to the fifteenth aspect, wherein the generating a data signal having a predetermined pattern uses a pulse pattern generator substantially included in the measurement subject.

In order to achieve the above object, according to a nineteenth aspect of the present invention, there is provided a jitter tolerance measurement method according to the fifteenth aspect, wherein, in the displaying, a first graph obtained by plotting and displaying the jitter tolerance value (J) on first two-dimensional orthogonal coordinates displaying the amplitude of the modulation signal as at ordinate thereof and the frequency of the modulation signal (M) as an abscissa thereof and a second graph obtained by plotting and displaying the jitter tolerance value (J) on second two-dimensional orthogonal coordinates displaying the amplitude of the modulation signal (M) as its ordinate and an offset frequency of the clock signal (C) as at abscissa thereof are displayed simultaneously on the screen.

In order to achieve the above object, according to a twentieth aspect of the present invention, there is provided a jitter tolerance measurement method according to the fifteenth aspect, wherein, in the displaying, three-dimensional orthogonal coordinates display the frequency (fc) of the clock signal (C) at a first coordinate axis, the frequency (fm) of the modulation signal (M) at a second coordinate axis and the jitter tolerance value (J) at a third coordinate axis on the screen, and the frequencies (fc, fm) and the jitter tolerance value (J) are plotted and displayed on the three-dimensional orthogonal coordinates.

BEST MODE OF CARRYING OUT THE INVENTION

Hereafter, embodiments of the present invention will be described with reference to the drawings.

First Embodiment

Figure 1:
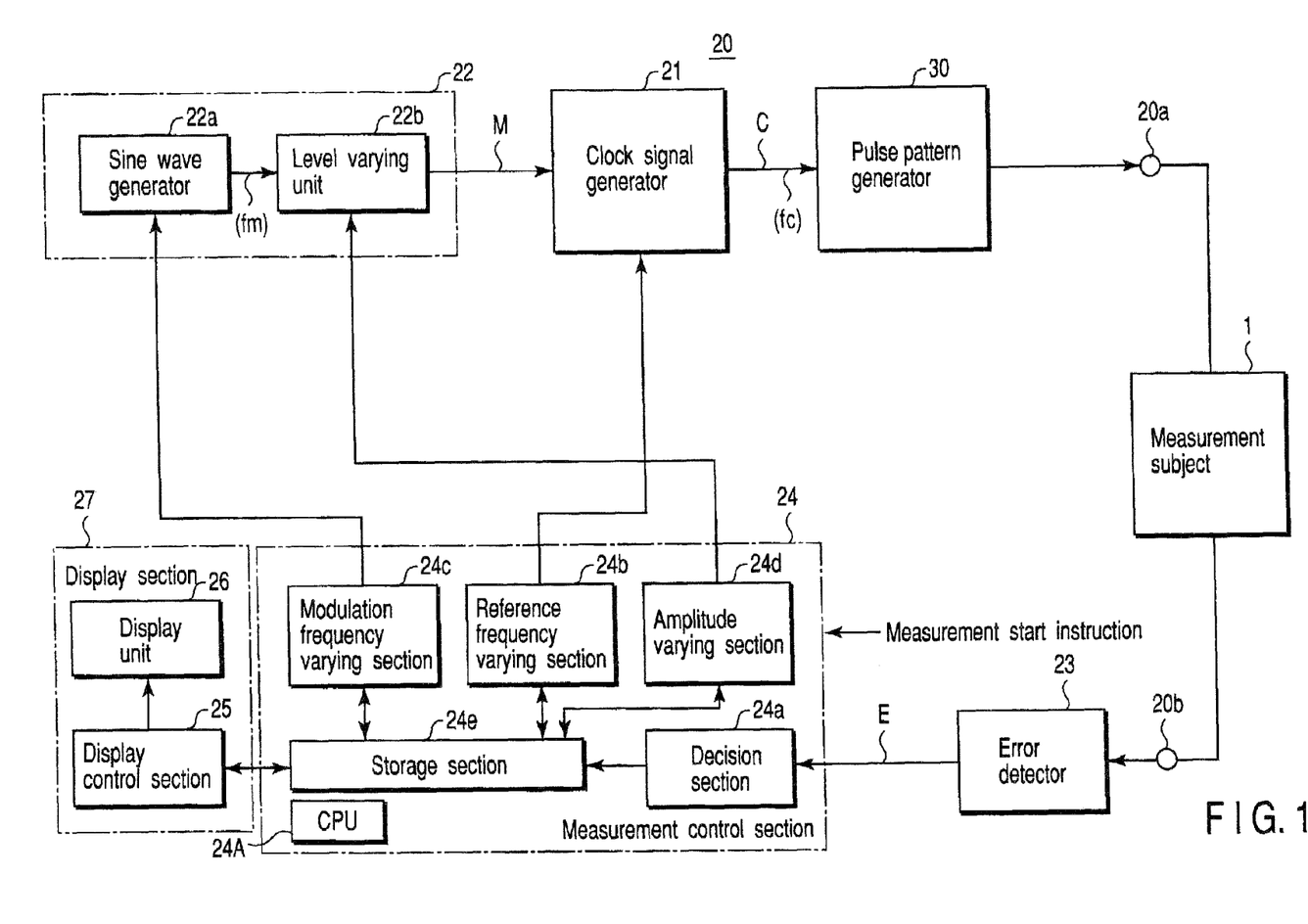
FIG. 1 is a block diagram showing a configuration of a first embodiment of a jitter tolerance measurement apparatus to which the present invention is applied.

FIG. 1 shows a configuration of a jitter tolerance measurement apparatus 20 to which the present invention is applied.

The jitter tolerance measurement apparatus 20 has a clock signal generator 21, a modulation signal generator 22, a pulse pattern generator 30, an error detector 23, a measurement control section 24, and a display section 27.

The clock signal generator 21 generates a clock signal having a frequency that is set from the measurement control section 24 described later, receives a modulation signal from the modulation signal generator 22, provides the clock signal with jitter depending on the modulation signal, and outputs the resultant clock signal.

Figure 4:
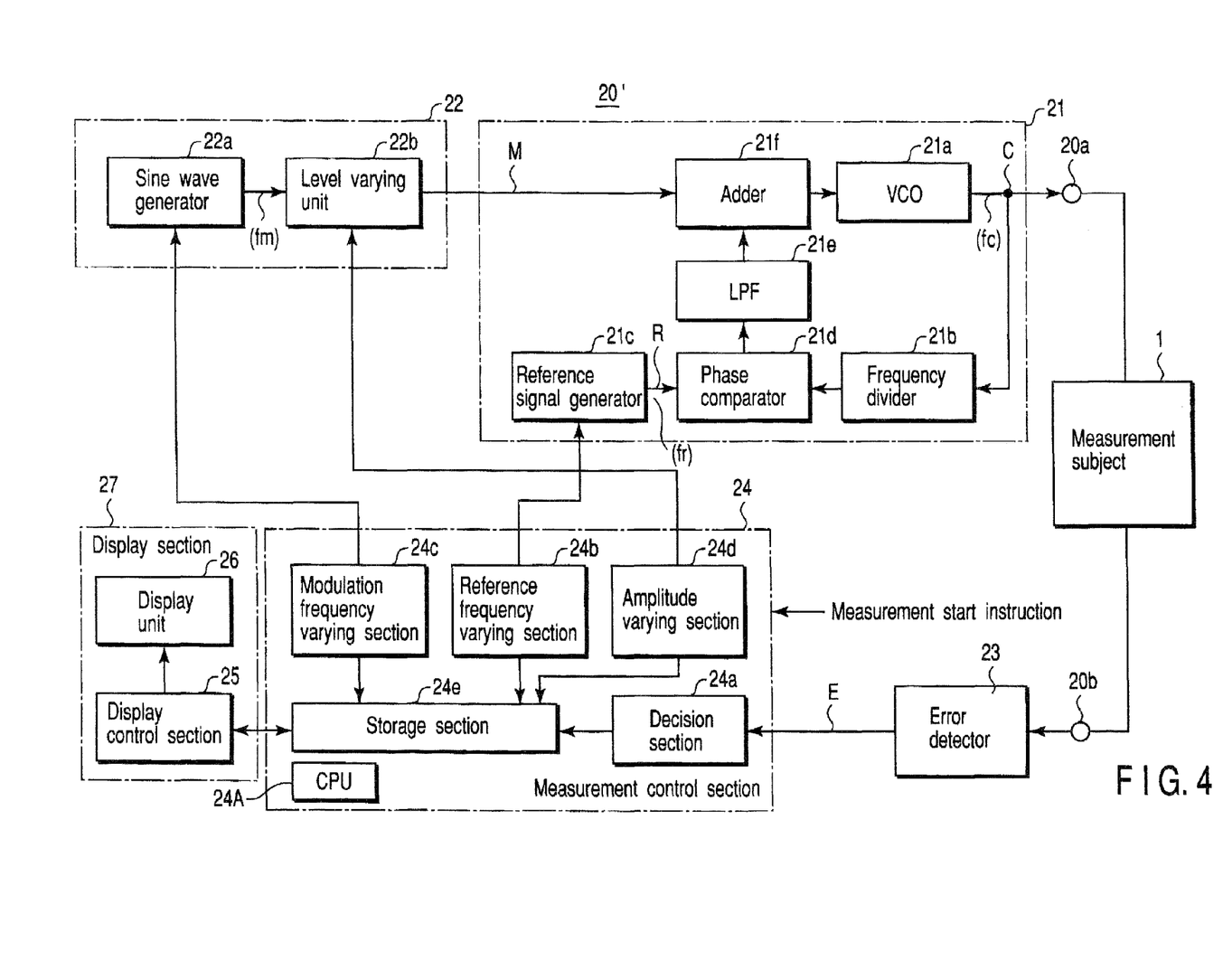
FIG. 4 is a block diagram showing a configuration of a second embodiment of the jitter tolerance measurement apparatus to which the present invention is applied.

To be concrete, the clock signal generator 21 has a phase locked loop (PLL) configuration formed of a VCO 21a, a frequency divider 21b, a reference signal generator 21c, a phase comparator 21d, an LPF 21e, and an adder 21f as shown in FIG. 4.

The VCO 21a outputs a clock signal C having a frequency fc corresponding to the voltage of the output signal of the adder 21f to the frequency divider 21b and an output terminal 20a.

The frequency divider 21b conducts frequency division on the clock signal C with a predetermined frequency division ratio N.

The reference signal generator 21c outputs a reference signal R having a frequency fr that is set from the measurement control section 24 described later.

The phase comparator 21d compares the output signal of the frequency divider 21b with the reference signal R output from the reference signal generator 21c as regards phase, and outputs a pulse signal having a width corresponding to the resultant phase difference.

The LPF 21e removes the signal component that is higher in frequency than the reference signal R from the pulse signal output from the phase comparator 21d, and outputs a DC signal having an amplitude corresponding to the phase difference between the output signal of the frequency divider 21b and the reference signal R.

The adder 21f adds the output signal of the LPF 21e and a modulation signal M output from the modulation signal generator 22, and outputs the result of the addition to the VCO 21a.

If, for example, the amplitude of the modulation signal M is zero, then the frequency fc of the clock signal C output from the VCO 21a is locked to N·fr by pull-in control conducted by the PLL. If the frequency fr of the reference signal R is varied, then the frequency fc of the clock signal C also changes.

Alternatively, if the amplitude of the modulation signal M is not zero, then the output of the VCO 21a is phase-modulated and frequency-modulated according to the instantaneous amplitude of the modulation signal M, and jitter occurs in the clock signal C.

Here, the frequency of the clock signal C is varied by varying the frequency of the reference signal R. However, it is also possible to vary the frequency of the clock signal C by varying the frequency division ratio N of the frequency divider 21b.

The modulation signal generator 22 is provided to output the modulation signal M having a variable frequency and a variable frequency to the clock signal generator 21.

In other words, the modulation signal generator 22 is constituted of a sine wave generator 22a which generates a sine wave signal having a frequency set by the measurement control section 24 described later and a constant amplitude, and a level varying unit 22b which, for example, attenuates the amplitude of the sine wave output from the sine wave generator 22a.

The modulation signal generator 22 outputs the output of the level varying unit 22b to the clock signal generator 21 as the modulation signal M.

The frequency and amplitude of the modulation signal M output by the modulation signal generator 22 are controlled to vary by the measurement control section 24.

The clock signal C output from the clock signal generator 21 is supplied to the pulse pattern generator 30.

The pulse pattern generator 30 generates a data signal having a predetermined pattern synchronized to the clock signal C as described above based on the clock signal C, and outputs the data signal to the output terminal 20a.

The data signal having the predetermined pattern output to the output terminal 20a is input to an external measurement subject 1 such as an external data relay device.

The measurement subject 1 operates based on the clock signal C contained in the data signal having the predetermined pattern, generates a data signal having a predetermined pattern corresponding to the clock signal C, and outputs it to an input terminal 20b.

The error detector 23 compares the data signal input via the input terminal 20b with a data sequence having a predetermined pattern set therein so as to become the same as the data signal having the predetermined pattern generated from the pulse pattern generator 30, measures the error rate E, and outputs the error rate E.

The measurement control section 24 includes a decision section 24a, a reference frequency varying section 24b, a modulation frequency varying section 24c, an amplitude varying section 24d, and a storage section 24e.

The decision section 24a compares the error rate E output from the error detector 23 with a preset reference value Er, determines whether or not the error rate E is in a reference range of the reference value Er or less, and outputs the decision result to the storage section 24e.

The reference frequency varying section 24b conducts control to vary the frequency fr of the reference signal R output from the reference signal generator 21c in the clock signal generator 21, and exchanges information of the frequency fr of the reference signal R with the storage section 24e.

The modulation frequency varying section 24c conducts control to vary the frequency of the sine wave signal output from the sine wave generator 22a in order to vary the frequency fm of the modulation signal M output from the modulation signal generator 22, and exchanges information of the frequency fm of the modulation signal M with the storage section 24e.

The amplitude varying section 24d conducts control to vary the output amplitude of the level varying unit 22b in order to vary the amplitude of the modulation signal M output from the modulation signal generator 22, and exchanges information of the amplitude of the modulation signal M with the storage section 24e.

The varying sections 24b, 24c and 24d, and the storage section 24e form a control section 24A for deriving a value that indicates jitter tolerance of the measurement subject 1, every combination of frequencies of the modulation signal M and the clock signal C.

In other words, upon receiving a measurement start instruction given by operation on an operation section, which is not illustrated, the control section 24A varies the frequency fr of the reference signal R output from the reference signal generator 21c, and the frequency of the sine wave signal output from the sine wave generator 22a in order to conduct control to vary the frequency fm of the modulation signal M output from the modulation signal generator 22, respectively with predetermined steps, by using the reference frequency varying section 24b and the modulation frequency varying section 24c so as to obtain a different combination of the frequency fc of the clock signal C and the frequency fm of the modulation signal M.

Every combination of the frequencies fc and fm determined by the reference frequency varying section 24b and the modulation frequency varying section 24c, the amplitude varying section 24d varies the amplitude of the modulation signal M. When the error rate E measured by the error detector 23 is determined to have exceeded the reference value Er by the decision section 24a, the control section 24A stores the amplitude value of the immediately preceding modulation signal M in the storage section 24e as a jitter tolerance value so as to be associated with the combination of the frequencies fc and fm.

Alternatively, the control section 24A may not use the jitter tolerance value itself as a value indicating jitter tolerance. That is, at a certain specific value of the amplitude of the modulation signal M determined by the amplitude varying section 24d every combination of the frequencies fc and fm, the decision section 24a effects a decision on the error rate E measured by the error detector 23. The control section 24A stores the decision result and the specific value of the amplitude in the storage section 24e as a jitter sweep value Js so as to be associated with the combination of the frequencies fc and fm.

As a matter of fact, the control section 24A (the measurement control section 24) includes a CPU and its peripheral circuits. Based on a program stored in a program ROM in the storage section 24e, the control section 24A (the measurement control section 24) causes automatic measurement of jitter tolerance as described later to be performed.

Besides the program ROM, the storage section 24e includes a ROM (EEPROM), which stores parameters $\alpha$ and $\beta$ for varying frequencies of the clock signal C and the modulation signal M required for automatic measurement of jitter tolerance and data for initializing the amplitude A of the modulation signal M in a table form, and a RAM for storing the above described decision result and so on.

The display section 27 has a display control section 25 and a display unit 26.

Under the control of the control section 24A, the display control section 25 of the display section 27 receives information of the frequency fc of the clock signal C, the frequency fr of the modulation signal M, and the amplitude of the modulation signal M and the value indicating the jitter tolerance value J stored in the storage section 24e, and causes the jitter tolerance characteristic of the measurement subject 1 to be displayed on a screen of the display unit 26 as two parameters, i.e., the frequency fc of the clock signal C and the frequency fr of the modulation signal M.

In other words, based on the frequencies fc and fm and the jitter tolerance value J stored in the storage section 24e in the control section 24A, the display control section 25 displays the jitter tolerance value J by taking the frequency of the clock signal C as a first parameter and the jitter tolerance value J by taking the frequency of the modulation signal M as a second parameter on the screen of the display unit 26 simultaneously so as to be capable of evaluating by a user.

Figure 3A:
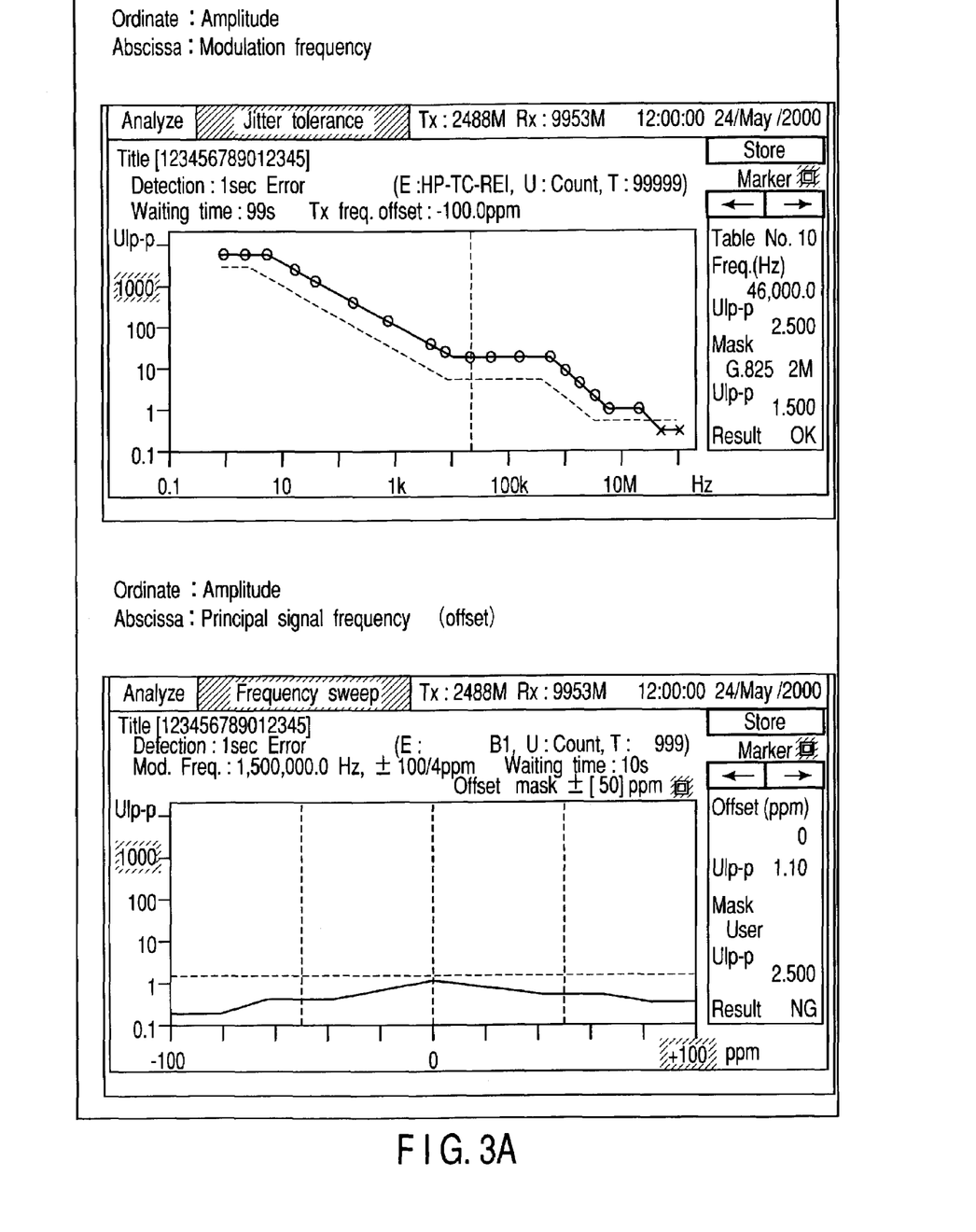
FIGS. 3A, 3B and 3C are diagrams showing display examples of measurement results of jitter tolerance conducted by the jitter tolerance measurement apparatus to which the present invention is applied.

At this time, the display control section 25, for example, causes a first graph obtained by plotting and displaying the jitter tolerance value J on first two-dimensional orthogonal coordinates having the amplitude of the modulation signal M as the ordinate and the frequency of the modulation signal as the abscissa and a second graph obtained by plotting and displaying the jitter tolerance value J on second two-dimensional orthogonal coordinates having the amplitude of the modulation signal M as the ordinate and a cut-off frequency of the clock signal C as the abscissa, to be displayed simultaneously on the screen of the display unit as shown in FIG. 3A.

Figure 3B:
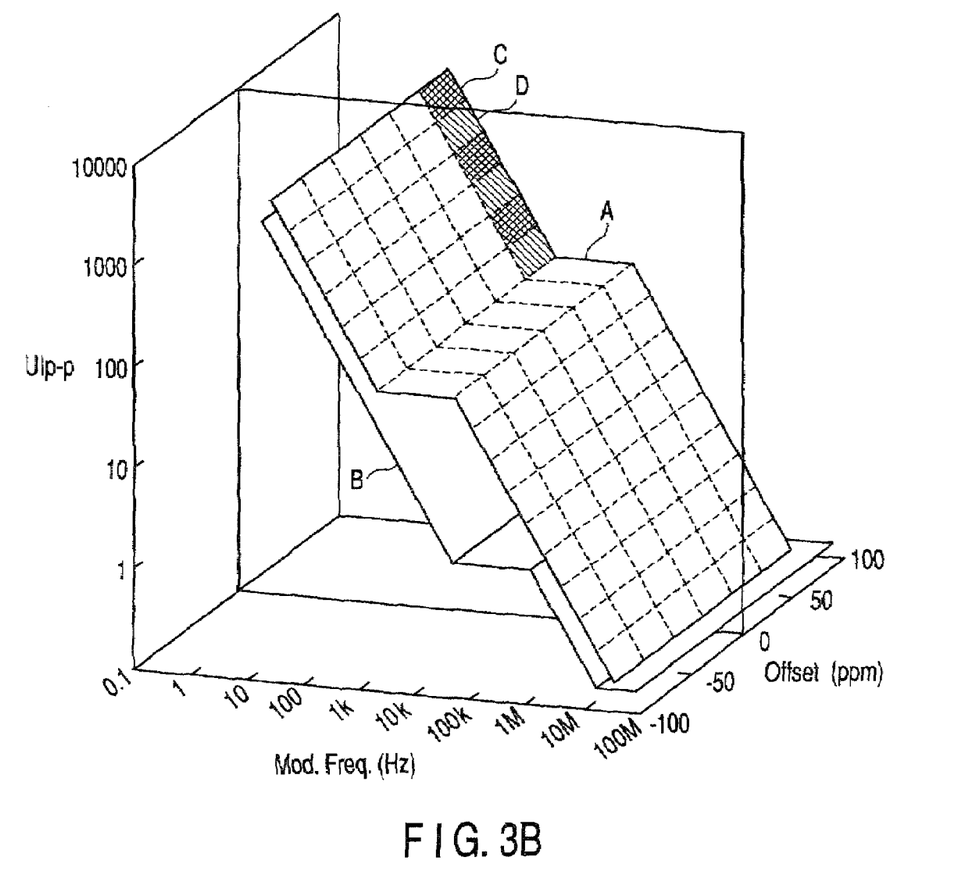

Furthermore, the display control section 25, for example, displays three-dimensional orthogonal coordinates displaying the frequency of the clock signal C at the first coordinate axis (for example, X-axis), the frequency of the modulation signal M at the second coordinate axis (for example, Y-axis) and the jitter tolerance value J at the third coordinate axis (for example, Z-axis) on the screen of the display unit 26, and causes the frequencies fc and fm and the jitter tolerance value J stored in the storage section 24e in the measurement control section 24 to be plotted and displayed on the three-dimensional orthogonal coordinates as shown in FIG. 3B.

Figure 3C:
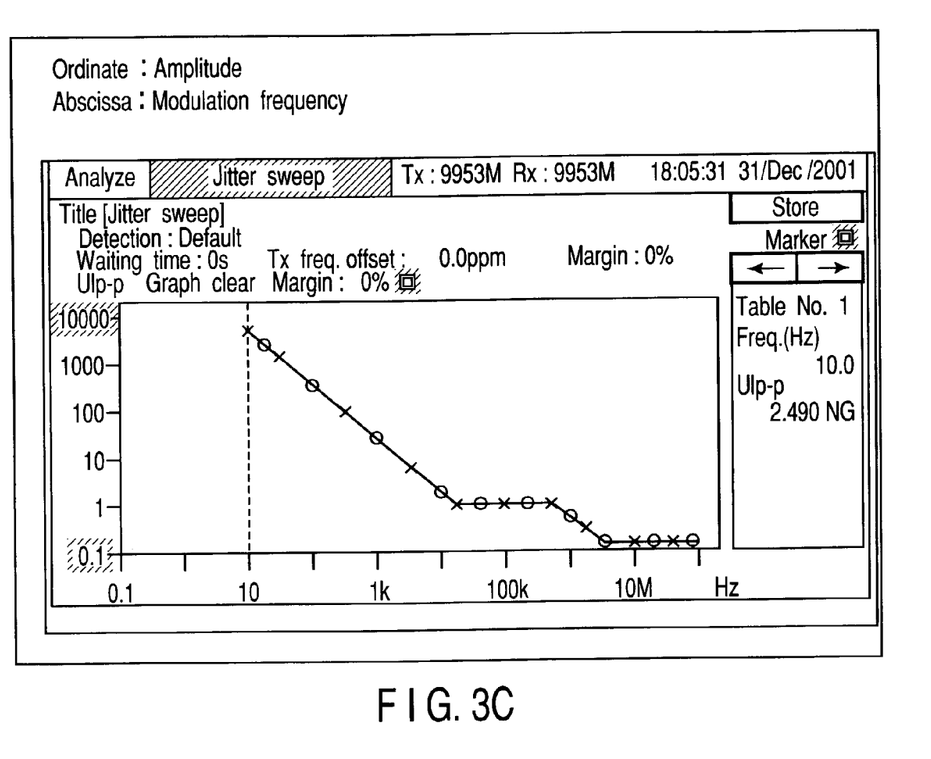

In the case where the jitter sweep value Js including the decision result and a specific value is used as a value representing the jitter tolerance, a mark, for example, X is displayed on a coordinate point representing a specific value of the amplitude of the modulation signal M if the reference value Er is exceeded, or another mark, for example, ○ is displayed on the coordinate point if the reference value Er is not exceeded as shown in, for example, FIG. 3C, so that it may be seen whether the jitter tolerance is good or bad every measurement point.

In the case where the jitter sweep is used, the mark X is displayed if the reference value Er is exceeded at the set modulation frequency and amplitude value.

In the case where jitter tolerance is used, a mark ○ or a mark X is displayed according to whether the amplitude value (jitter tolerance point) at a set modulation frequency exceeds a mask or not, as shown in, for example, FIG. 3A.

Figure 2:
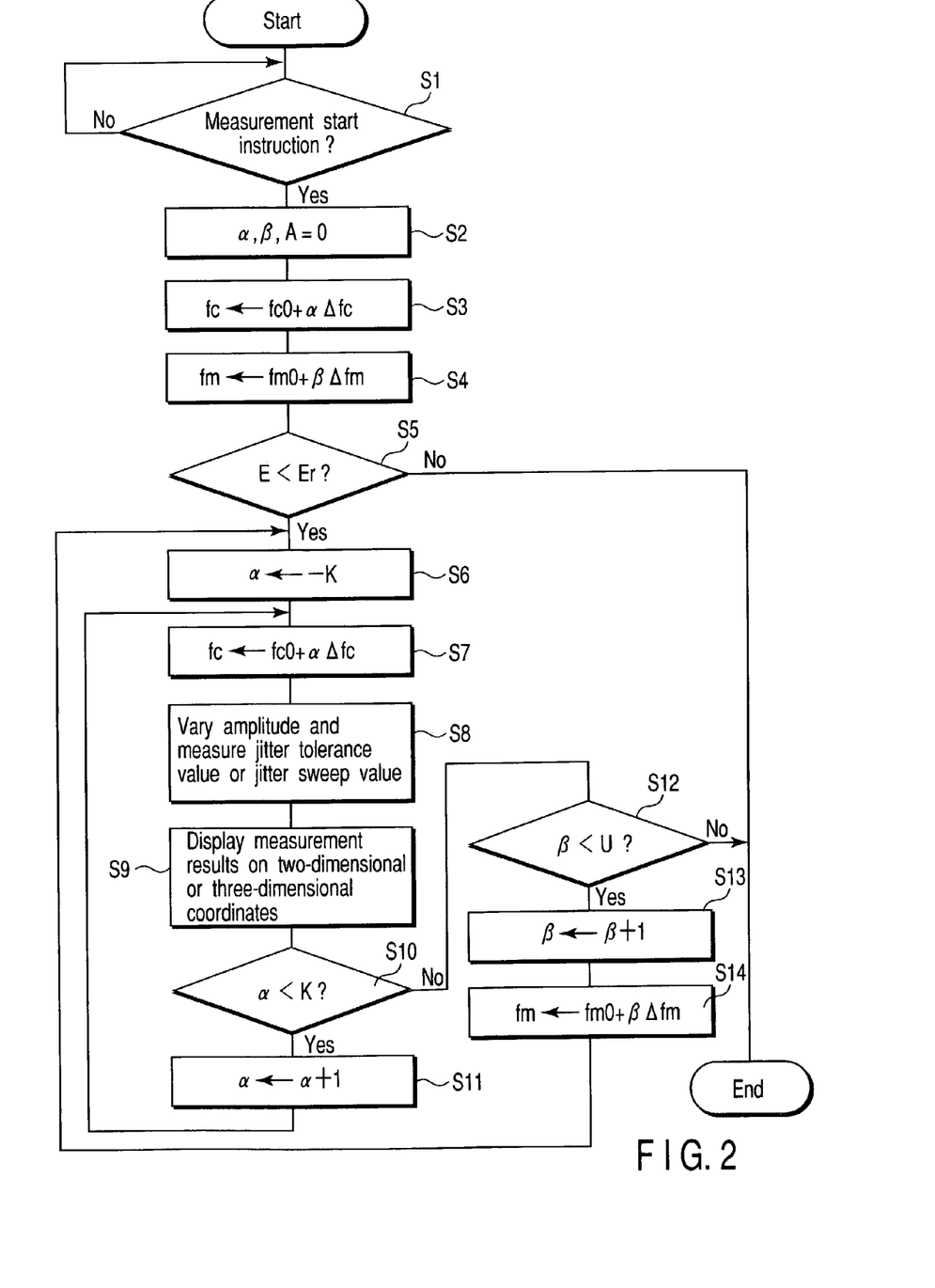
FIG. 2 is a flowchart showing operation of a principal part of the embodiment shown in FIG. 1.

Operation of the jitter tolerance measurement apparatus 20 will now be described with reference to the flowchart as shown in FIG. 2.

First, when a measurement start instruction is given from the outside, the control section 24A (the measurement control section 24) initializes the parameters $\alpha$ and $\beta$ for varying the frequencies of the clock signal C and the modulation signal M, and the amplitude A of the modulation signal M to zero (steps S1 and S2).

Assuming the frequency correctly corresponding to the frequency of the data signal handled by the measurement subject 1 to be fc0 and the variable step to be $\Delta$fc, the control section 24A (the measurement control section 24) sets the frequency fc of the clock signal C equal to fc0+$\alpha\cdot\Delta$fc (as a matter of fact, it depends on the setting of the frequency of the reference signal R) (step S3).

Assuming the initial modulation frequency of the modulation signal M to be fm0 and the variable step to be $\Delta$fm, the control section 24A (the measurement control section 24) sets the frequency fm of the modulation signal M equal to fm0+$\beta\cdot\Delta$fm (step S4)

In this state, the control section 24A (the measurement control section 24) determines whether the error rate E output from the error detector 23 exceeds the reference value Er (step S5).

In this state, the clock signal C is not phase-modulated by the modulation signal M, and the parameters $\alpha$ and $\beta$ are zero. Therefore, the frequency of the clock signal C correctly corresponds to the frequency of the data signal handled by the measurement subject 1.

If there is no abnormality in the measurement subject 1, therefore, then the data signal output from the measurement subject 1 becomes a predetermined pattern sequence and consequently the error rate output from the error detector 23 is less than the reference value Er.

If in this state it is confirmed by the decision section 24a that the error rate E is less than the reference value Er, then the control section 24A (the measurement control section 24) alters the parameter $\alpha$ to substract K from a lower limit value (where K is a positive integer) by using the reference frequency varying section 24b (step S6).

As a result, the frequency fc of the clock signal C is varied to the lower limit frequency fc0−K·$\Delta$fc (step S7).

Subsequently, in such a state that the amplitude of the modulation signal M has been varied, the control section 24A (the measurement control section 24) conducts measurement of the jitter tolerance value J or the jitter sweep value (jitter tolerance measurement) on the measurement subject 1 (step S8).

Based on a preset order given by an operation section, which is not illustrated, the control section 24A (the measurement control section 24) displays the measurement results on the above described two-dimensional or three-dimensional orthogonal coordinates on the screen of the display unit 26 via the display control section 25 (step S9).

In the case where the measurement results are displayed on the two-dimensional orthogonal coordinates, the control section 24A (the measurement control section 24) displays a first graph obtained by plotting and displaying the jitter tolerance value J on first two-dimensional orthogonal coordinates displaying the amplitude of the modulation signal M at the ordinate and the frequency of the modulation signal at the abscissa and a second graph obtained by plotting and displaying the jitter tolerance value J on second two-dimensional orthogonal coordinates displaying the amplitude of the modulation signal M at the ordinate and an offset frequency of the clock signal C at the abscissa, simultaneously on the screen of the display unit via the display control section 25 (FIG. 3A).

In the case where the measurement results are displayed on the three-dimensional orthogonal coordinates, the control section 24A (the measurement control section 24) conducts display on three-dimensional orthogonal coordinates displaying the frequency of the clock signal C at the x-axis, the frequency of the modulation signal M at the y-axis and the jitter tolerance measurement results at the z-axis on the screen of the displaying unit via the display control section 25 (FIG. 3B).

The control section 24A (the measurement control section 24) conducts the jitter tolerance measurement of the measurement subject 1 and processing of the measurement results whenever the parameter $\alpha$ is increased, i.e., whenever the frequency of the clock signal C is increased by $\Delta$fc, and repeats the measurement and the processing until the parameter $\alpha$ becomes equal to an upper limit value K (steps S10 and S11).

As a result, (2K+1) sets of measurement results of the clock signal frequency versus jitter tolerance in such a state that the frequency fm of the modulation signal of the modulation signal M is equal to the initial value fm0 are stored in the storage section 24e.

The control section 24A (the measurement control section 24) displays the measurement results on the two-dimensional or three-dimensional coordinates of the display unit 26 one after another as described above via the display control section 25.

When measurement of jitter tolerance with the parameter α equal to the upper limit value K is finished, the control section 24A (the measurement control section 24) increases the parameter β, which determines the frequency of the modulation signal M, by one, if the parameter β is less than a final value U (positive integer) (steps S12 and S13).

Subsequently, the control section 24A (the measurement control section 24) increases the frequency fm of the modulation signal M by βΔfm (step S14).

In this state, the control section 24A (the measurement control section 24) conducts the processing of steps S6, S7, S8, S9, S10 and S11.

As a result, (2K+1) sets of measurement results of the clock signal frequency versus jitter tolerance in such a state that the frequency fm of the modulation signal M is equal to fm0+βΔfm are obtained, and the measurement results are gradually displayed.

In the same way, whenever the parameter β is increased by one until it arrives at a final value U (positive integer), (2K+1) sets of measurement results of the clock signal frequency versus jitter tolerance in such a state that the frequency fm of the modulation signal M is equal to fm0+β·Δfm are obtained, and the measurement results are gradually displayed.

For each of (U+1) frequencies fm of the modulation signal M ranging from the initial value fm0 to a final value fm0+UΔfm, therefore, (2K+1) sets of measurement results of the clock signal frequency versus jitter tolerance are stored in the storage section 24e.

In the case where all jitter tolerance values J shown in FIG. 3B are plotted and displayed on the three-dimensional coordinates, character A in FIG. 3B denotes actually measured value data. The actually measured data A are displayed together with information that indicates the margin by which the actually measured value data A exceeds mask data (i.e., reference value data for determining whether the measurement result is good (OK) or bad (NG)) denoted by B in FIG. 3B.

As denoted by character C (cross-hatched portion) and character D (ordinary hatched portion) in FIG. 3B, information of the margin from the mask data at each measurement point is used and the display color is changed according to the degree of the margin. As a result, the degree of the margin of jitter tolerance from a reference value under the severest condition can be discriminated from such a display.

In the case where a jitter tolerance value is displayed as a value indicating the jitter tolerance, the mark of "○" or the mark of "X" is displayed according to whether an amplitude value (jitter tolerance point) at a set modulation frequency exceeds the mask as shown in, for example, FIG. 3A. Thus display is conducted so that the degree of jitter tolerance may be discriminated.

In the case where the jitter sweep value is displayed as a value representing the jitter tolerance, a mark, for example, X is displayed on a coordinate point representing a specific value of the amplitude of the modulation signal M if the reference value Er is exceeded, or another mark, for example, ○ is displayed on the coordinate point if the reference value Er is not exceeded as shown in, for example, FIG. 3C, so that it may be appreciated whether the jitter tolerance is good or bad every measurement point, as described above. Thus display is conducted so that the degree of jitter tolerance may be discriminated.

As a result, the user can know jitter tolerance characteristics of the measurement subject at a glance.

On the two-dimensional or three-dimensional coordinates, a deviation of the frequency of the clock signal C from the frequency fcC is displayed by taking parts per million (ppm) as the unit and the jitter tolerance value J is displayed by taking UIp-p (unit interval) as the unit, as shown in FIGS. 3A, 3B and 3C.

On the two-dimensional or three-dimensional coordinates, a logarithmic scale is used as the frequency scale of the modulation signal M, as shown in FIGS. 3A, 3B and 3C. Therefore, the two-dimensional or three-dimensional coordinates do not accurately correspond to the description of the flowchart based on FIG. 2.

In other words, in the description of the flowchart based on FIG. 2, the parameter β for varying the frequency of the modulation signal M stored in the storage section 24e in table form is used, and consequently it is assumed that the frequency scale of the modulation signal M is a linear scale.

In the case where a logarithmic scale is used as the frequency scale of the modulation signal M, therefore, it is necessary to handle the frequency of the modulation signal M as an arrangement of fm(n) represented in table form, and alter the expression "fm←fm0+βΔfm" in steps S4 and S14 in the flowchart shown in FIG. 2 to the expression "fm←fm (β)".

By watching jitter tolerance characteristics displayed in a two-dimensional or three-dimensional form in the jitter tolerance measurement apparatus according to the present invention so that the jitter tolerance characteristics of the measurement subject may be evaluated simultaneously with the clock signal frequency and the modulation signal frequency taken as two parameters, the user can ascertain at a glance how the jitter tolerance of the measurement subject 1 changes for all combinations of deviation magnitude of the frequency of the clock signal C and height of the frequency (jitter frequency) of the modulation signal M.

In the above described measurement, jitter tolerance is automatically measured for all combinations of the frequency fc of the clock signal C and the frequency fm of the modulation signal M in a predetermined range. Without relying on spot measurement, therefore, measurement can be conducted efficiently.

The display control section 25 has a function of displaying a marker in an arbitrary position of the jitter tolerance characteristics displayed on the display unit 26. If the position of the marker is varied by operating the operations section, which is not illustrated, then the frequency of the clock signal C corresponding to the x-axis of the marker, the frequency of the modulation signal M corresponding to the y-axis of the marker, and the jitter tolerance value (or jitter sweep value) corresponding to the z-axis of the marker can be displayed with numerical values in a predetermined position of the display screen.

In the foregoing description, the frequency of the clock signal C is varied in a predetermined range in such a state that the frequency of the modulation signal M is fixed, and then the frequency of the modulation signal M is varied in step form. This operation is repeated.

Conversely, however, the operation of varying the frequency of the modulation signal M in a predetermined range in such a state that the frequency of the clock signal C is fixed, and then varying the frequency of the clock signal C in step form may be repeated.

In the foregoing description, the frequency of the modulation signal M is varied and a value indicating jitter tolerance is derived, for each of the combinations of frequencies of the clock signal C and the modulation signal M, and the jitter tolerance measurement result is displayed on the display unit 26 in real time.

However, it is also possible to derive measurement results for all combinations of frequencies of the clock signal C and the modulation signal M and then display the measurement results on the display unit 26.

Second Embodiment

FIG. 4 shows the configuration of a jitter tolerance measurement apparatus 20' in a second embodiment to which the present invention is applied.

The jitter tolerance measurement apparatus 20' includes a clock signal generator 21, a modulation signal generator 22, an error detector 23, a measurement control section 24, and a display section 27.

In other words, the configuration of the jitter tolerance measurement apparatus 20' in the second embodiment is a configuration obtained by removing the pulse pattern generator 30 from the jitter tolerance measurement apparatus 20 in the first embodiment shown in FIG. 1.

In some measurement subjects 1, it is considered that the measurement subject 1 has substantially a configuration equivalent to the pulse pattern generator 30. In such a case, therefore, the clock signal C is supplied directly to the measurement subject 1 by utilizing an equivalent of the pulse pattern generator 30 included in the measurement subject 1, and a data signal having a predetermined pattern as described earlier is generated in the measurement subject 1.

In this case, the error detector 23 compares the data signal input via an input terminal 20b with a data sequence having a predetermined pattern set therein so as to become the same as the data signal having the predetermined pattern generated from the pulse pattern generator 30 in the measurement subject 1, measures the error rate E, and outputs the error rate E.

Also in the configuration of the jitter tolerance measurement apparatus 20' according to the second embodiment, operation effects similar to those of the jitter tolerance measurement apparatus 20 according to the first embodiment shown in FIG. 1 can be obtained.

As heretofore described, a jitter tolerance measurement apparatus according to the present invention includes:

a modulation signal generator (22) for outputting a modulation signal having a variable frequency and a variable amplitude;

a clock signal generator (21) for generating a clock signal having a variable frequency, receiving the modulation signal output from the modulation signal generator, generating jitter based on the modulation signal on the clock signal, and outputting the clock signal provided with the jitter;

a pulse pattern generator (30) for receiving the clock signal provided with the jitter, output from the clock signal generator, generating a data signal having a predetermined pattern, and supplying the data signal to a measurement subject (1);

an error detector (23) for receiving a data signal having the predetermined pattern output from the measurement subject which operates based on the data signal having the predetermined pattern output from the pulse pattern generator, comparing the received data signal with a preset data sequence having a predetermined pattern, and measuring errors in the data signal having the predetermined pattern output from the measurement subject;

a decision section (24a) for effecting a decision as to whether errors output from the error detector are in a preset reference range, and outputting a decision result;

a control section (24b to 24e) for conducting control to vary the amplitude of the modulation signal when conducting control to vary a combination of a frequency of the clock signal and a frequency of the modulation signal by controlling the clock signal generator and the modulation signal generator, and deriving a value indicating jitter tolerance of the measurement subject based on the decision result and information of the amplitude of the modulation signal; and a display section (25, 26) for receiving information concerning the frequency of the clock signal, the frequency of the modulation signal, and the amplitude of the modulation signal, and the value indicating jitter tolerance, and displaying jitter tolerance characteristics of the measurement subject simultaneously on a screen by using the frequency of the clock signal and the frequency of the modulation signal as two parameters.

According to such a jitter tolerance measurement apparatus, the user can ascertain at a glance how the jitter tolerance of the measurement subject changes for all combinations of deviation magnitude of the frequency of the clock signal and height of the frequency (jitter frequency) of the modulation signal.

Furthermore, according to such a jitter tolerance measurement apparatus, jitter tolerance is automatically measured for all combinations of the frequency of the clock signal and the frequency of the modulation signal in a predetermined range. Without relying on spot measurement as in the prior art, therefore, measurement can be conducted efficiently.

According to the present invention as heretofore described, therefore, it becomes possible to provide a jitter tolerance measurement apparatus that is capable of solving the above described problems, evaluating jitter tolerance characteristics of a measurement subject simultaneously by using the clock signal frequency and the modulation signal frequency as two parameters and measuring the jitter tolerance characteristics efficiently.

Furthermore, according to the present invention, it becomes possible to provide a jitter tolerance measurement method that is capable of solving the above described problems, evaluating jitter tolerance characteristics of a measurement subject simultaneously by using the clock signal frequency and the modulation signal frequency as two parameters and measuring the jitter tolerance characteristics efficiently.

The invention claimed is:

1. A jitter tolerance measurement apparatus comprising:
a modulation signal generator which outputs a modulation signal having a variable frequency and a variable amplitude;
a clock signal generator which generates a clock signal having a variable frequency, receives the modulation signal output from the modulation signal generator, generates jitter based on the modulation signal on the clock signal, and outputs the clock signal provided with the jitter;
a pulse pattern generator which receives the clock signal provided with the jitter, output from the clock signal generator, generates a data signal having a predetermined pattern, and supplies the data signal to a measurement subject;
an error detector which receives a data signal having the predetermined pattern output from the measurement subject that operates based on the data signal having the predetermined pattern output from the pulse pattern generator, compares the data signal with a preset data sequence having a predetermined pattern, and thereby measures errors in the data signal having the predetermined pattern output from the measurement subject;

a decision section which decides whether or not errors output from the error detector are in a preset reference range, and outputs a decision result;

a control section which conducts control to vary the amplitude of the modulation signal every time the control section conducts control to vary a combination of a frequency of the clock signal and a frequency of the modulation signal by controlling the clock signal generator and the modulation signal generator, and derives a value indicating jitter tolerance of the measurement subject based on the decision result and information of the amplitude of the modulation signal; and a display section which receives information concerning the frequency of the clock signal, the frequency of the modulation signal, and the amplitude of the modulation signal that are controlled by the control section, and the value indicating jitter tolerance, and displays jitter tolerance characteristics of the measurement subject simultaneously on a screen by using the frequency of the clock signal and the frequency of the modulation signal as two parameters.

2. A jitter tolerance measurement apparatus according to claim 1, wherein the control section derives an immediately preceding amplitude value of the modulation signal as the value indicating jitter tolerance, when the amplitude of the modulation signal is varied and the decision section has determined the reference range to be exceeded.

3. A jitter tolerance measurement apparatus according to claim 1, wherein, when the amplitude of the modulation signal is set to a specific value, the control section represents the decision result of whether or not the preset reference range is exceeded by the decision section and a specific value of the amplitude of the modulation signal as the value indicating jitter tolerance.

4. A jitter tolerance measurement apparatus according to claim 1, wherein a unit substantially included in the measurement subject is used as the pulse pattern generator.

5. A jitter tolerance measurement apparatus according to claim 1, wherein the modulation signal generator outputs a modulation signal having a variable frequency and a variable amplitude to the clock signal generator, and comprises a sine wave generator which generates a sine wave signal having a frequency set by the control section and a fixed amplitude, and a level varying unit which varies an amplitude of a sine wave output from the sine wave generator, and an output of the level varying unit is output to the clock signal generator as the modulation signal.

6. A jitter tolerance measurement apparatus according to claim 1, wherein the clock signal generator generates a clock signal having a frequency set by the control section, receives a modulation signal output from the modulation signal generator, generates jitter based on the modulation signal on the clock signal, and outputs the clock signal provided with the jitter, the clock signal generator having a phase locked loop (PLL) configuration formed of a voltage-controlled oscillator (VCO), a frequency divider, a reference signal generator, a phase comparator, a low-pass filter (LPF), and an adder, the VCO outputs the clock signal having a frequency corresponding to a voltage of an output signal from the adder, to the frequency divider and an output terminal of the VCO, the frequency divider conducts frequency division on the clock signal with a predetermined frequency division ratio, the reference signal generator outputs a reference signal having a frequency set by the control section, the phase comparator compares an output signal from the frequency divider with the reference signal output from the reference signal generator to obtain a phase difference, and outputs a pulse signal having a pulse width corresponding to the phase difference, the LPF removes a signal component higher than a frequency of the reference signal from the pulse signal output from the phase comparator, and outputs a DC signal having an amplitude corresponding to the phase difference between the output signal of the frequency divider and the reference signal, and the adder adds an output signal from the LPF and the modulation signal output from the modulation signal generator, and outputs an addition result to the VCO.

7. A jitter tolerance measurement apparatus according to claim 1, wherein the error detector compares a data signal sequence input thereto from the measurement subject with a reference signal sequence having the predetermined pattern to measure an error rate, and outputs the error rate.

8. A jitter tolerance measurement apparatus according to claim 7, wherein the decision section compares the error rate output from the error detector with a preset reference value, decides whether or not the error rate is in a reference range of the reference value or less, and outputs a decision result.

9. A jitter tolerance measurement apparatus according to claim 8, wherein the control section has a reference frequency varying section, a modulation frequency varying section, an amplitude varying section and a storage section, the reference frequency varying section conducts control to vary a frequency of a reference signal output by a reference signal generator in the clock signal generator, the modulation frequency varying section conducts control to vary a frequency of the modulation signal output by the modulation signal generator, the amplitude varying section conducts control to vary an amplitude of the modulation signal output by the modulation signal generator, the storage section stores the amplitude value of the immediately preceding modulation signal as a jitter tolerance value so as to be associated with the combination of the frequencies, when the reference frequency varying section and the modulation frequency varying section respectively vary the frequency of the clock signal and the frequency of the modulation signal so as to form a different combination of the frequency of the clock signal and the frequency of the modulation signal, the amplitude varying section varies the amplitude of the modulation signal every combination of the frequencies, and an error rate measured by the error detector is determined by the decision section to have exceeded the reference value.

10. A jitter tolerance measurement apparatus according to claim 8, wherein the storage section stores the decision result of the decision section on an error rate measured by the error detector and a specific value of the amplitude as a jitter sweep value so as to be associated with the combination of the frequencies, at a certain specific value of the amplitude of the modulation signal determined by the amplitude varying section every combination of the frequencies, and instead of storing the jitter tolerance value itself as the value indicating jitter tolerance.

11. A jitter tolerance measurement apparatus according to claim 10, wherein
the display section has a display control section and a display unit,
the display control section displays the jitter tolerance value J by taking the frequency of the clock signal as a first parameter and the jitter tolerance value J by taking the frequency of the modulation signal as a second parameter on a screen of the display unit simultaneously so as to be capable of evaluating by a user, based on the frequencies and the jitter tolerance value stored in the storage section in the control section.

12. A jitter tolerance measurement apparatus according to claim 11, wherein the display control section displays a first graph obtained by plotting and displaying the jitter tolerance value on first two-dimensional orthogonal coordinates displaying the amplitude of the modulation signal at an ordinate thereof and the frequency of the modulation signal at the abscissa thereof and a second graph obtained by plotting and displaying the jitter tolerance value on second two-dimensional orthogonal coordinates displaying the amplitude of the modulation signal at the ordinate thereof and an offset frequency of the clock signal as the abscissa thereof simultaneously on the screen of the display unit.

13. A jitter tolerance measurement apparatus according to claim 11, wherein the display control section displays three-dimensional orthogonal coordinates displaying the frequency of the clock signal at a first coordinate axis, the frequency of the modulation signal at a second coordinate axis and the jitter tolerance value at a third coordinate axis on the screen of the display unit, and plots and displays the frequencies and the jitter tolerance value stored in the storage section in the control section on the three-dimensional orthogonal coordinates.

14. A jitter tolerance measurement apparatus according to claim 11, wherein the jitter tolerance is displayed so that whether the jitter tolerance is good or bad or a margin from the reference value may be discriminated every measurement point.

15. A jitter tolerance measurement method comprising:
outputting a modulation signal having a variable frequency and a variable amplitude;
generating a clock signal having a variable frequency, receiving the modulation signal, generating jitter based on the modulation signal on the clock signal, and outputting the clock signal provided with the jitter;
receiving the clock signal provided with the jitter and output, and generating a data signal having a predetermined pattern;
receiving a data signal having the predetermined pattern output from a measurement subject that operates based on the data signal having the predetermined pattern, comparing the data signal with a preset data sequence having a predetermined pattern, and measuring errors in the data signal having the predetermined pattern output from the measurement subject;
deciding whether or not the measured errors are in a preset reference range, and outputting a decision result;
conducting control to vary the amplitude of the modulation signal when conducting control to vary a combination of a frequency of the clock signal and a frequency of the modulation signal, and deriving a value indicating jitter tolerance of the measurement subject based on the decision result and information of the amplitude of the modulation signal; and
receiving information concerning the frequency of the clock signal, the frequency of the modulation signal, and the amplitude of the modulation signal, and the value indicating jitter tolerance, and displaying jitter tolerance characteristics of the measurement subject simultaneously on a screen by using the frequency of the clock signal and the frequency of the modulation signal as two parameters.

16. A jitter tolerance measurement method according to claim 15, wherein the controlling derives an immediately preceding amplitude value of the modulation signal as the value indicating jitter tolerance, when the amplitude of the modulation signal is varied and the decision section has determined the reference range is exceeded.

17. A jitter tolerance measurement method according to claim 15, wherein when the amplitude of the modulation signal is set to a specific value, the controlling represents the decision result of whether or not the preset reference range is exceeded and a specific value of the amplitude of the modulation signal as the value indicating jitter tolerance.

18. A jitter tolerance measurement method according to claim 15, wherein the generating a data signal having a predetermined pattern uses a pulse pattern generator substantially included in the measurement subject.

19. A jitter tolerance measurement method according to claim 15, wherein, in the displaying, a first graph obtained by plotting and displaying the jitter tolerance value on first two-dimensional orthogonal coordinates displaying the amplitude of the modulation signal as an ordinate thereof and the frequency of the modulation signal as an abscissa thereof and a second graph obtained by plotting and displaying the jitter tolerance value on second two-dimensional orthogonal coordinates displaying the amplitude of the modulation signal as an ordinate thereof and an offset frequency of the clock signal as an abscissa thereof are displayed simultaneously on the screen.

20. A jitter tolerance measurement method according to claim 15, wherein, in the displaying, three-dimensional orthogonal coordinates display the frequency of the clock signal at a first coordinate axis, the frequency of the modulation signal at a second coordinate axis and the jitter tolerance value at a third coordinate axis on the screen, and the frequencies and the jitter tolerance value are plotted and displayed on the three-dimensional orthogonal coordinates.

* * * * *